United States Patent
Ackley et al.

(10) Patent No.: US 9,148,202 B2
(45) Date of Patent: Sep. 29, 2015

(54) RFID-BASED COMMUNICATION DEVICES AND METHODS FOR LOCATION-BASED ENTERTAINMENT SYSTEMS

(75) Inventors: Jonathan Michael Ackley, Glendale, CA (US); Kevin R. Rice, Altadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 1747 days.

(21) Appl. No.: 12/477,693

(22) Filed: Jun. 3, 2009

(65) Prior Publication Data

US 2010/0308964 A1    Dec. 9, 2010

(51) Int. Cl.
*G05B 11/01*      (2006.01)
*H04B 5/00*       (2006.01)
*G06K 19/073*     (2006.01)
*G06K 17/00*      (2006.01)

(52) U.S. Cl.
CPC ........ *H04B 5/0062* (2013.01); *G06K 19/07327* (2013.01); *H04B 5/0031* (2013.01); *H04B 5/0037* (2013.01); *G06K 2017/0067* (2013.01)

(58) Field of Classification Search
USPC .............. 340/1.1, 12.1, 12.15, 12.22, 12.5, 340/12.51, 10.1–10.6, 572.1–572.9; 235/375–385
See application file for complete search history.

(56) References Cited

U.S. PATENT DOCUMENTS

| | | | |
|---|---|---|---|
| 5,508,909 A * | 4/1996 | Maxwell et al. | 700/18 |
| 2006/0267737 A1* | 11/2006 | Colby | 340/10.51 |
| 2007/0024463 A1* | 2/2007 | Hall et al. | 340/825.69 |
| 2008/0136640 A1* | 6/2008 | Lund | 340/572.1 |

* cited by examiner

*Primary Examiner* — James Yang
(74) *Attorney, Agent, or Firm* — Marsh Fischmann & Breyfogle; Kent A. Lembke

(57) ABSTRACT

An interactive entertainment system using radio-frequency identification (RFID) technology to allow participants to communicate user input to the system. The system includes an interactive station including an RFID reader and wireless communication devices that each has a user input portion operable by a user. Each communication device includes an RFID assembly that operates to broadcast to the RFID reader tag data, which is selectable by a user by operating the user input portion. The RFID assembly may use passive RFID tags that are activated or operable in response to user input such as pressing a button associated with an RFID tags, which causes the RFID tag to be read by the RFID reader to obtain a button ID. The RFID assembly may include an active RFID tag and a computing device that selectively modifies tag memory based on user input to communicate user messages to the RFID reader.

9 Claims, 7 Drawing Sheets

RFID-BASED COMMUNICATION DEVICES AND METHODS FOR LOCATION-BASED ENTERTAINMENT SYSTEMS

BACKGROUND

1. Field of the Description

The present description relates, in general, to interactive entertainment, and, more particularly, to systems, devices, and methods for providing location-based entertainment that allows a participant or user to communicate information to an entertainment system to participate with or interact with displayed information (text, images, stimuli, and so on), such as to respond to questions posed to participants on a monitor of a game system.

2. Relevant Background

There are many applications where it is desirable to encourage people to move from one geographic location to another within a facility. For example, an entertainment facility such as an attraction at a theme park may find it desirable to move numerous visitors through an attraction over time, and this may be achieved by providing interactive entertainment or games that dynamically move the players or participants through a facility during game play (e.g., each player is trying to solve a riddle or enhance their game state by moving from interactive station to interactive station). In a shopping store or mall environment, it may be desirable to encourage shoppers to visit differing locations within a store to sample, view, or otherwise experience certain products or displays. Each of these facilities may be thought of location-based attractions in which it may be useful to shunt or purposefully drive traffic through or about geographic or physical locations of the attraction.

One useful technique for driving traffic within a facility is to provide location-based interactivity. For example, this may involve a player of an interactive game traveling to a particular location that may be associated with an interactive game station, their presence at the first location being detected by a game system, and game information being communicated to and from the player. Unfortunately, triggering installed interactivity in a location-based application such as a theme park can be an expensive proposition.

In the past, interactive game or entertainment systems have provided each player with a wireless communication device such as a cellular telephone or the like that was equipped with global positioning satellite (GPS) components. This allowed the system to track the location of the player and also allowed the system to communicate data to the player and the player to communicate data to the game system. GPS-based interactive systems though often were not as effective or useful for indoor settings and often could only provide relatively inaccurate locations (such as within a 30 meter radius). Also, providing each player with a GPS-enabled, two-way communication device causes the system to be very expensive to operate (e.g., each user device may cost well over $100 U.S. dollars), and this requires the system operator to require return of the devices as the player leaves the facility and causes expenses associated with device loss, damage, and maintenance.

In other interactive systems, communication between a player, an off-board game system, and in-facility special effects is achieved by providing each player with a data-enabled, cellphone handset along with an active radio frequency identification (RFID) tag. The cellphone is typically configured to run custom software to process received game data, provide an interactive display on the handset display screen, and process user input via a touch screen or keypad. The battery-powered RFID tag was used to transmit a signal that is accepted by a receiver proximate to a game station, and the signal includes identification data (e.g., a device ID) that is linked by the game system to the particular player. While this allows the location of the player to be accurately determined, use of an active RFID tag adds to the cost of the already expensive cellphone adapted to run game software programs. As with the GPS-based device, the facility operator is forced to collect the handsets/game communication devices as each player leaves the facility and spend money on replacing lost, stolen, damaged, and inoperative devices.

Hence, there remains a demand for less expensive communication devices that allow users (or players) to interact with wireless/remote communications with interactive stations or installations provided in an entertainment or other interactive facility, e.g., to allow players to participate in an interactive game presented by a game system at one or more geographic locations of a facility such as a theme park or the like.

SUMMARY

Embodiments of the present invention address the above and other problems by providing interactive entertainment systems and methods that allow participants or users to interact or communicate with one or more interactive stations or installations. Communication with each user is achieved in some cases with a relatively inexpensive communication device or controller that utilizes one or more radio-frequency identification (RFID) tags to not only communicate a unique ID (UID) but also to provide user inputted/selected data to the interactive station (e.g., to an RFID reader provided at the station). In some cases, the communication device includes a set of passive RFID tags that are selectively operable by the user, such as by pressing a button, and each of these tags may be read by the RFID reader to obtain a UID, which can be used to identify the participant by querying an interactive system or game system server or a database, and also to obtain a button ID (e.g., a button associated with an answer to a question presented at the interactive station).

In other cases, the communication device may include an active/semi-active RFID tag and a computing device that may modify the data stream or payload broadcast by RFID tag in response to user input (e.g., to indicate which button(s) was chosen by the user). In some cases, a computing device (or logic and hardware) of the communication device may determine that a user's input message is too long/large for a single broadcast by the onboard RFID tag(s), and, in such a case, the computing device may break the user input message/data into a set of data chunks or messages that can then be provided in a series of broadcasts by the RFID tag by modifying a user data input portion of the tag memory/data. Additionally, data useful for reassembling the series of broadcast tag messages may be provided in each broadcast stream of tag data such as a packet identifier, a timestamp, data type, and the like along with a UID. In this manner, the RFD tag of the communication device may be used to provide slow speed data communications (slow relative to a data-enabled cellular phone or the like) and not to just provide an RFID UID or another fixed and repeated set of information.

More particularly, an interactive entertainment system is provided that uses RFID technology to allow users or participants to communicate user input or selectable data to the system (e.g., to answer a multiple choice question, to type in and transmit an answer to a short answer question, and the like). The system includes an interactive station including an RFID reader and a display device for displaying interactive data. The system also includes a plurality of communication devices that each has a user input portion operable by a user or participant of the interactive entertainment system. Each of the communication devices includes an RFID assembly that operates to broadcast to the RFID reader a set of tag data, which is selectable or chosen by a user by operating the user input portion (e.g., pressing one of a number of buttons on the exterior of the communication device housing).

In some embodiments, a user's communication device may be "binary" with a single button and associated RFID tag, with an RFID "On" and an RFID "Off" state. For instance, the user or a park guest may be using the communication device to trigger a particular interaction (e.g., a guest may not be playing an interactive game requiring multiple answers but simply triggering special effects). In some cases, the communication device may include only one button with a passive RFID tag.

In other embodiments, the RFID assembly may include at least two passive RFID tags that each has a differing data payload (e.g., each RFID tag may have memory providing a unique ID (UID) and a button ID). The user input portion may be operable to selectively activate one of the passive RFID tags to broadcast the set of tag data including the data payload of the activated one of the passive RFID tags. The user input portion may include a set of buttons with each of the buttons being associated with one of the RFID tags such that pressing a button activates (or allows interrogation by an RFID reader). The communication device may also include a tag activation mechanism that is associated with or operable by the user input portion. The tag activation mechanism may respond to operation of the user input portion (such as a user pressing a button or the like) by activating one of the passive RFID tags. The mechanism may include devices for selectively shielding the passive RFID tags to only allow activated ones to be energized by the reader and broadcast their data payload or tag data, while other embodiments may include devices for completing a shorted antenna circuit to allow broadcasting to be completed for an activated tag.

According to another aspect, the RFID assembly may include an active or semi-active RFID tag and a computing device (e.g., logic run by a processor or software/hardware components) that processes input from the user input portion. The computing device may respond to input by modifying the set of tag data that is broadcast to the RFID reader by the RFID tag. The user input portion may include a set of buttons and the set of tag data may include a bit/byte or data stream including a first portion that provides the state of each of the buttons and a second portion that provides an RFID UID or tag/communication device/user identifier. The computing device may separate the input from the user input portion into a set of user input data messages (e.g., when the input is too large a payload for one tag-based broadcast). Then the modifying of the set of tag data by the computing device may include repeating the modifying to transmit a series of RFID data broadcasts that each includes one of the user input data messages, a UID, and data/information for use in assembling/processing the series of RFID data broadcasts (e.g., to rebuild or understand the input provided by the user via the user input portion). The interactive entertainment system may include a computing device running software or logic modules that assemble the series of RFID data broadcasts to produce the set of user input data messages (or the user input) and then to operate the interactive station in response to the user input or assembled broadcasts (e.g., to update/modify a video screen to show the user's ID, name, or the like when the user input provides a correct answer to a question or proper/requested entertainment system interaction). The data for use in assembling the series of messages from the RFID tag may include packet/message identification, a time stamp, a data type, and the like.

DETAILED DESCRIPTION

Figure 1:
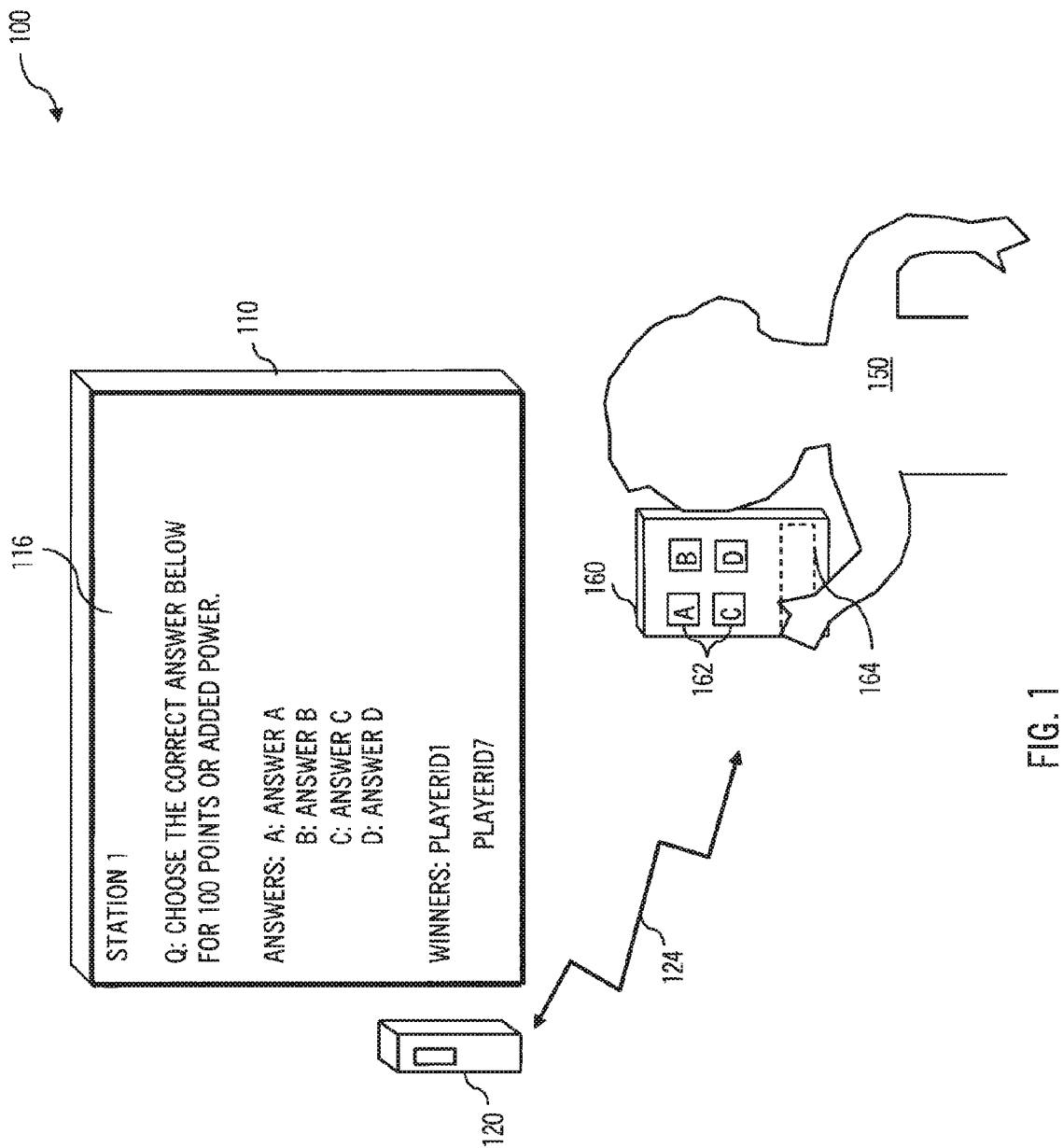
FIG. 1 illustrates a portion of an interactive communication system that may be used to allow a user to communicate data that they input via a communication device or controller to the system (e.g., respond to a question presented at a location-based interactive station or the like)

The present invention involves devices and methods for providing location-based entertainment. The inventors recognized that generally a location-based entertainment system determines if a specific user or player is near or in front of an interactive installation or station and then allows the user or player to select particular data to transmit to the system logic (such as a game engine or software running on a game server). Prior devices used relatively expensive and complicated communication devices such as wireless handsets with semi-active RFID tags with an RFID reader determining when a player was proximate to an installation and the wireless device (such as a data-enable cellular phone) allowing the game system to communicate with the player and the player to communicate game data back to the game system.

The following description presents an interactive communication system, which is well-suited for providing interactive games, in which an interactive station is able to determine a location of a player or participant using RFD technologies and the user is able to communicate data to logic or game engine with one or more embodiments of a player or participant communication device. The communication device in one embodiment uses a set of passive RFID tags that are selectively activated by the player or participant to allow the communication system to determine a location of a particular participant proximate (or within a communication radius for an RFID reader or the like) to an interactive station or installation and also to communicate user-input/selected data to the logic or game engine (e.g., by selecting a button or switch on the communication device the user may identify themselves to the station and also provide a particular data input such as an answer to a question).

In other embodiments, the communication device may include logic that processes user input such as operation of buttons or a key pad, and, based on this processed user input, modifies a portion of RFID data or bit/byte stream. The RFID tag(s) may be active or semi-active in such embodiments, and the modified RFID data stream or broadcast may be used to transmit a single message with information including a user ID as well as user-input data or to transmit a set or number of messages that include the user ID as well as user-input data that may be combined by the system logic or game engine to produce a more complex message (e.g., the RFID tag may be used to provide slow speed communication by providing a few to many bytes of data that are user-input/selected in each message/broadcast until a desired amount of data is transmitted). By use of these embodiments, a relatively inexpensive RFID-based communication device may be used to provide entertaining interactive experiences, and, in many cases, the communication device can actually be purchased as a souvenir by the participant or handed out to the participants rather than requiring collection and maintenance of expensive cell phone handset or the like.

FIG. 1 illustrates a portion of a communication system or interactive entertainment system 100, e.g., a single interactive station or installation that may be provided in a larger facility such as a theme park, a museum, a mall, or the like. The system 100 includes a display device 110 that may take the form of a projection screen, a television-type monitor, or the like with a display surface 116. A local controller and/or a system engine/controller may be used to provide interactive data on the surface 116 or otherwise request actions/interactivity from a participant or player 150 that causes the participant 150 to provide user input or user-selected data. As shown, for example, the station monitor/display 110 may be used to display a question to the participant 150 (with one participant shown for simplicity of illustration whereas many stations 100 may service numerous participants) and possible answers and then display participants or players that have correctly answered the question.

To allow the participant 150 to provide their input/data, the system 100 includes a wireless communication device 120 such as an RFID reader or the like. The system 100 also includes a participant communication device 160 that includes an RFID assembly 164 for communicating 124 with the RFID reader 120. As discussed above, the participant communication device 160 may include a number of passive RFID tags in the assembly 164 that are selectively activated (or allowed to be powered by the RFID reader 120) by the participant 150 operating data input components (e.g., a button or switch may be associated with each passive RFID tag) to input one of the answers on the display surface 116 of monitor 110. The buttons 162 may be labeled similar to the answers or requested data on surface 116 and/or have a similar number and/or physical arrangement to facilitate proper data input by the participant 150. For example, there may be 3 to 5 or more possible answers (requested data inputs) and a like number of buttons 162 (and RFID tags in assembly 164), with similar labeling such as A-D, 1-4, Red/Yellow/Blue/Green, or the like when the number is four. In other cases, the participant communication device 160 may include an active or semi-active RFID tag(s) in assembly 164 and logic/hardware that acts to modify the user inputted/selected portion or fields of the RFID data stream 124 passed to the reader 120 to indicate a user's input via buttons 162 (as is explained in more detail below).

The information in signals/communications 124 is passed from reader/communication device 120 to a local controller and/or system logic/game engines to determine which participant 150 has provided the data (e.g., based on a user ID portion of the RFID tag data) and whether the answer is correct (e.g., did the participant 150 provide the correct answer on their first try). If correct, the user's records may be updated to indicate/track correct answers and/or to modify their state (e.g., their present game state which may be a total number of points, certain earned powers, levels of a game successfully completed, and so on) for later use by the system 100. The participants 150 that correctly answer the question or provide requested user input data via signals/communications 124 may have their name/ID displayed upon the surface 116 of display device 110.

Prior to further discussing particular systems and device configurations, it may be useful to describe generally an embodiment that utilizes a participant communication device using one or more passive RFID tag and an embodiment that utilizes a participant communication device using one or more active or semi-active RFID tag and logic/software and/or hardware to process user inputs to provide an RFID-based data communication unit or device. The use of passive RFID tags provides a very inexpensive interactive communication or entertainment system as each participant communication device may be produced for a few dollars in parts/components and raw material costs. Such a participant communication device or controller would have no battery and would not require a computing device or logic/hardware for processing user input, which simplifies its production/design and limits manufacturing costs.

In the passive RFID tag embodiment, the controller or participant communication device may contain a set of passive RFID tags that are each linked to a particular input from the user. For example, the user inputs may be buttons on an external surface of the device housing that are linked to a displayed request for user input as discussed above with buttons A-D that may be linked to answers A-D of an interactive installation. Prior to a user input or data transmit selection, each of the passive RFID tags may be inactivated (or blocked from activation by an RFID reader) by a tag activation mechanism. In one embodiment, a shield or piece of metal may contact or cover all or a portion of the tag such that its ability to gather RF energy from an RFID reader is impeded to the point where it cannot broadcast its tag number including the RFID number or user ID. When the user presses a button on the housing of the controller or communication device, the shield and RFID tag may be separated or contact ended such that the passive RFID tag associated with the button or input device is able to gather power from an RFID reader and to broadcast the RFID tag data associated with that button successfully to the RFID reader (e.g., to broadcast data including a user ID and a button ID or the like). In another implementation, each passive RFID tag may be built or provided with a short-circuited antenna such that when a linked or corresponding button or other user input device/component is operated by the user/participant the antenna's circuit is physically completed (e.g., the short circuit is removed), which allows the RFID tag to be successfully activated by an RFID reader.

Each of the passive RFID tags may include the unique ID of its user in its broadcast stream. This would allow the interactive system or server-side logic to individually track the inputs of the participant (e.g., to update their game status, their state, and so on). This embodiment may support multiple buttons with each button having its own passive RFID) tag. Each of these tags may either have a unique RFD number for each button or each tag or its memory may contain the same UID but have an area with memory (or bytes) representing each unique button on the device (e.g., button ID information understood by the server-side logic as being associated with a particular button or user input device).

The use case of the guessing game shown in FIG. 1 may readily be implemented with the passive RFID tag communication device. For example, when prompted, the participant may press one of the buttons 162 on their device. The passive RFID tag is then allowed by a tag activation mechanism in the assembly 164 to transmit 124 to the reader 120 the participant's unique ID along with the data (e.g., a bit, a byte, or the like) representing the pressed button (e.g., the button ID). The RFID reader 120 receives the RFID stream or data 124 and sends it via a network or other digital communications link to the interactive system logic (e.g., to a game engine or logic running on a game server or the like). The system logic then may separate the UID from the button ID and determine whether the player/participant has guessed correctly and respond accordingly such as by updating their state or score in a user/player record of a game database, by displaying the user's ID/name on the interactive station display 110, and so on.

In other embodiments, an active RFID tag (or tags) is used within the RFID assembly (such as assembly 164) of a participant/user communication device (such as device 160). The RFID tag in this embodiment is powered with a battery and is connected to a computing device in the communication device (e.g., logic and hardware for processing user inputs and, in response, altering RFID tag data may be provided in assembly 164). The computing device may take many forms ranging from a device that may process input from a user operating a few buttons to logic used to run a hand-held game console to running a fully functioning portable computer. For example, the communication device 160 may be a game console or computing/communication device with a keypad, a touchscreen, or other user input components that may be managed by the computing device and its logic to determine how to modify RFID tag data and when (in some cases) to transmit a signal (such as signal 124) to an interactive system receiver (such as receiver 120) with this modified tag data (that now includes user input or selected data).

In this embodiment of a controller or communication device, the participant interacts with the portable computing device (such as via user input (I/O) devices that are controlled/managed by a processor and interface/RFID control logic (application logic or the like) run by the processor). The results of this interaction are processed on the controller or communication device. When the application logic on the controller or communication device deems it appropriate, the computing device or CPU changes the data broadcast by the RFID tag (e.g., changes the tag memory/data such as its bits, bytes, or the like). For example, a participant may be asked to stand at a particular location near an interactive station or installation and enter their name on their controller or communication device. The participant keys in their name via the user input device(s) and the CPU and logic on the device act to change the bytes/memory associated with the RFID tag. Hence, when the participant finishes entering his name, the active tag may be used to transmit the name (or other user inputted data) with the tag's unique identifier (UID) to an interactive system receiver or communication device (e.g., the RFID reader 120 shown in system 100 of FIG. 1).

With this communication technique or process, an RFID-based communication device or controller may be used to transmit short or even long sequences of information even though the data storage or memory capabilities of the RFID tag (or its byte string) is typically limited. For instance, a participant engages in an interactive game or application in an interactive system or at a particular station/installation that requires a large amount of data to be transmitted to an interactive/game server for processing. Instead of using a data-enabled cell phone or the like, the controller or communication device may use its CPU/logic to modify the RFID tag's memory or data/byte string to facilitate breaking the message into multiple, smaller (e.g., fewer data bits or bytes) messages, which may be temporarily stored in device memory accessible by the CPU/logic and then sequentially provided in a series of RFID tag data strings (e.g., a message that may require 8 bytes may be sent in 8 messages having the UID and one byte of user provided data for later assembly by the interactive system receiver, station logic, or the game/interactive server and its application(s)). In one embodiment, the controller's logic/hardware modifies the RFID tag's byte string/data fields by adding a time stamp and/or packet ID and a portion of the metadata or user input data along with the tag's UID. The controller or communication device is then operated to send out the data in a sequence to be reassembled by the interactive system server or other device/logic once the device or controller has finished broadcasting to an RFID reader or a receiver (such as device 120 of FIG. 1). In this way, the active RFID tag of the communication device may be used as a low-speed data connection for the participant that eliminates the need for a device to contain multiple, expensive, and often difficult to configure radio systems.

In one entertainment implementation, the system 100 may include one or more of such active RFID tag-based devices 160 used by participants 150. Participants 150 may be in a queue line (such as ride line in a theme park, a waiting line of a theater, or the like) and be playing a game together via the video screen 116. The video screen 116 may be used by the system 100 to display a multiple choice question and indicate that the participant 150 that answers the question correctly first will receive points. Each participant 150 may hold a controller or communication device 160 that has, in this example, four buttons 162 and an active RFID-based communication assembly 164 (as described above) but, at least in this case, no display (although some systems 100 may use controllers 160 with display devices and/or more complicated I/O components). A first participant 150 may guess that the correct answer is a first answer and push a corresponding first button 162 on their controller 150, which powers the active tag.

Logic and hardware (such as a CPU or the like in or connected to the assembly 164) on the controller 150 takes the pressing of the first button 162 as an input, and in the RFID memory or data stream a bit/byte (or some other portion of the tag memory) is set aside to represent the state of this first or corresponding button. The interface between the controller logic/hardware and the RFID tag memory/chip changes this bit, byte, or portion of memory from 0 (not pressed) to 1 (pressed in this example). The RFID tag of assembly 164 may then begin to beacon its UID along with other metadata (such as the states of the 4 buttons 162). The RFD reader 120 collects this first response it receives and passes it to the server-side application logic. The application may first check to see if the proper button has been pressed. The logic may look at the bit, byte, or portion of memory representing the correct answer button (e.g., a fourth button). Since the correct button was not selected by this participant 150, the game logic finds a database record for the participant 150 entering the first button by looking up their UID in the database and then records or increments the answered wrong field for that player by 1 (or otherwise tracks their wrong answer such as by subtracting points or lessening their power level or so on).

The next player 150 may press the correct or fourth button 162 on their controller 160. The fourth button bit, byte, or portion of memory associated with the button on the RFID tag may be set in the RFID number stream, and the RFID tag may then be powered to broadcast the UID and user-input metadata or game data to the reader 120, which passes it to the logic of the game server. The game logic verifies that only the fourth button is set in the RFD stream, and then it may add the appropriate number of points to the score field in the data base record associated with the received UID (or otherwise indicates a correct answer such as by increasing the player's state in the game or the like) in the received RFID data stream. The game logic then may cause the player's login or ID name to appear on the video screen 116 of the system 100 with, for example, a congratulations message or the like.

Figure 2A:
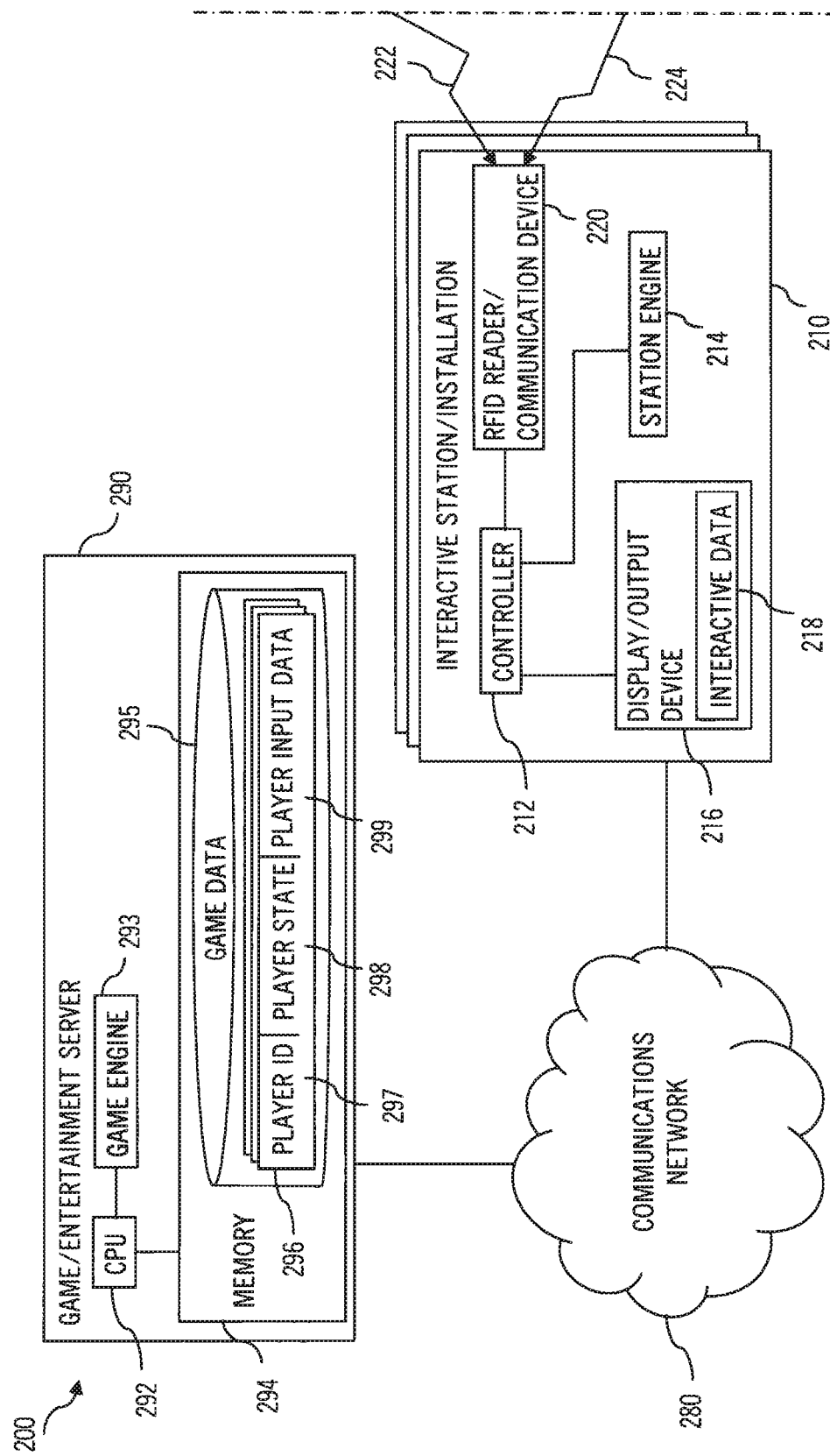
FIG. 2 is a functional block diagram of an interactive entertainment (or communication) system showing use of communication devices using passive RFID assemblies and using active (or semi-active) RFID assemblies to facilitate communications by the user/player with the entertainment system.
Figure 2B:
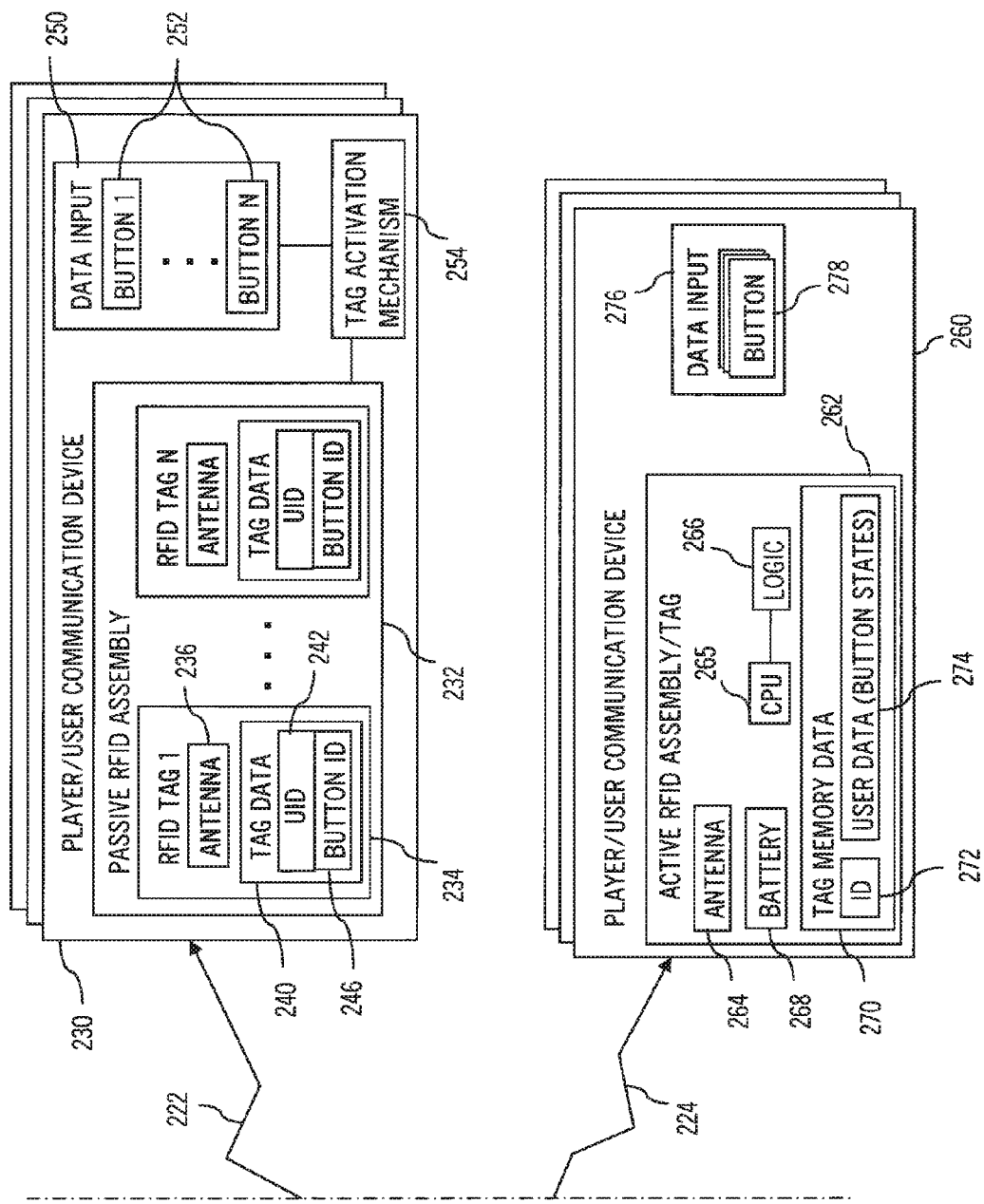

FIG. 2 illustrates an interactive game or communication system 200 that includes both of the participant communication device/controller embodiments discussed above to allow participants to communicate with a game/entertainment server 290 and/or interact with one or more interactive stations/installations. The system 200 may be used to provide an interactive experience such as a game that encourages participants or users to move about a physical environment from one geographic location to another. To this end, the system 200 may include a number of interactive stations/installations 210 that may be provided at differing, spaced apart locations and that are adapted to communicate with participants in a predefined vicinity (such as within 30 feet or less or the like). Each interactive station 210 may include a controller (a CPU and/or other hardware/software for providing the communication/display functionality described herein) 212 that controls operation of a display/output device 216 such as a video screen or the like that is used to selectively display interactive data 218 (e.g., game or entertainment data for viewing by participants near the station 210 and encouraging the participants to enter user data (such as enter an answer to a question, enter a message, and so on)). The interactive station 210 may also include a station engine 214 that is run by the controller that may provide logic/software that is run to control what interactive data 218 is displayed such as by processing user input data as received by an RFID reader/communication device 220, which in turn is used to interrogate/activate 222 passive RFID tags and/or receive messages 224 from active/semiactive RFID tags.

The interactive stations/installations 210 may be standalone systems/devices adapted to interact and communicate with participants or, as shown, each of the interactive stations/installations 210 may be communicatively linked with a game/entertainment server 290 such as via wired or wireless connections via a digital data communications network 280. The entertainment server 290 may include a processor 292 that runs logic (such as a game engine or application) 293 for presenting one or more interactive games/activities at the various interactive stations/installations and/or for tracking game/player data provided by the interactive stations 210 for participants in the system 200. The processor 292 also manages a memory/data store 294 that may be used by the game engine 293 for storing participant or game data 295 such as records 296 for each participant with a player/participant ID field (that may be the same or correspond in some manner with a UID(s) of an RFID tag/communication device 230, 260). Each record 296 may include a player ID/UID field 297 for storing data that identifies the participant and/or their communication device 230, 260. Each record 296 may also include a player state/status field 298 that may be used to indicate the participant's present status in the game such as number of correctly answered questions, their point total, their current level/power state, and so on as may be useful for tracking participations and/or success within a game or an entertainment/educational application. Further, the record 296 may include one or more player-input data field 299 that may be used to store data communicated, such as via active RFID tag-based communication devices 260, by a participant in system 200 such as their name or other metadata provided in response to displayed interactive data 218 on an interactive station/installation.

A participant may use the player/user communication device or controller 230 to interact and communicate 222 with an interactive station 210. The device 230 includes a passive RFID assembly 232 that is responsive to a user operating the data or user input portion 250 of the device 230 to being activated/read 222 by RFID reader 220. Specifically, the RFID assembly 232 may include one or more passive RFID tags 234 that each are associated with a like number of buttons 252 of the data input portion 250, and when the user/participant of the device 230 pushes a button 252 a tag activation mechanism 254 is operated or operates to activate (or allow reading 222) a corresponding one of the RFID tags 234. Each RFID tag 234 includes two sections including an antenna 236 and a memory or circuit/chip portion with tag data 240.

The tag data 240, for example, may include a unique ID (UID) 242 that may be associated by a record 296 stored by the entertainment server 290 with a player/participant using the device 230 (e.g., the player ID field 297 may include the UID, the record 296 may include both a UID field and a player ID/name field 297, or the like) The tag data 240 may also include a button ID portion 246 that identifies to the station engine 214 and/or the game engine 293 which button the tag data 240 is associated with or which one of the buttons 234 has been depressed/operated by the participant in response to the interactive data 218. Typically, only one button 252 is operated at a time to activate one of the tags 234 but two, three, or more of the buttons 252 may be used at a time (or concurrently or in a pattern) in some embodiments to allow more data to be communicated 222 to the interactive station 210 (e.g., instead of four buttons being selectable combinations of one, two, three, or four buttons may be chosen concurrently or in some sequence).

Figure 3A:
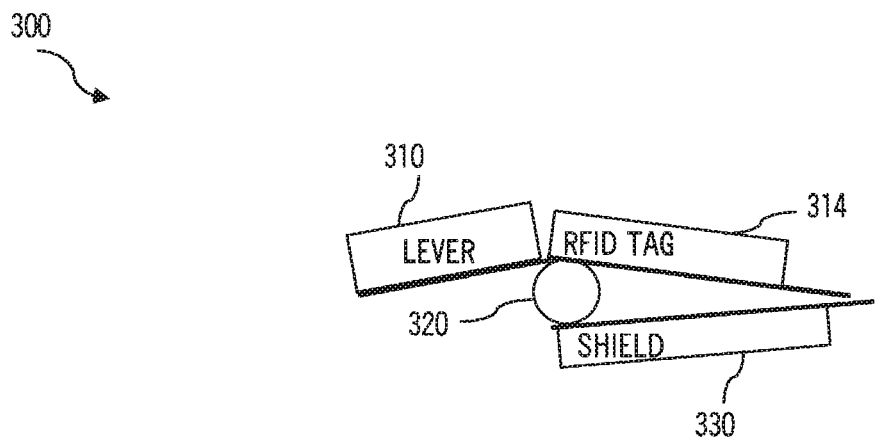
FIGS. 3A and 3B illustrate a tag activation mechanism that may be used in user communication devices or controllers such as the devices shown in FIGS. 1 and 2.
Figure 3B:
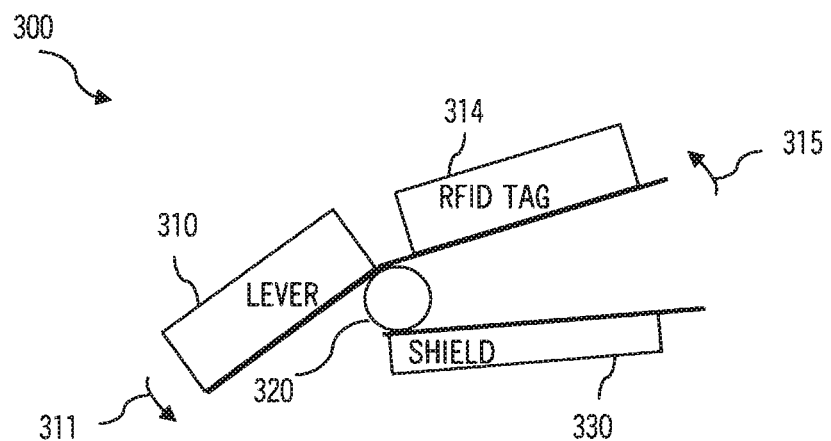

The tag activation mechanisms 254 may take a variety of forms to practice the communication device 230 such as a mechanism that completes a short circuit in the antenna 236. In other embodiments, a shield may prevent the RFID reader 220 from energizing/reading 222 the tag 234. For example, FIGS. 3A and 3B illustrate a tag activation mechanism 300 that may be used for the mechanism 254 for one or more of the buttons 252 to allow the button 252 to activate one of the passive RFID tags 234. As shown, the mechanism 300 includes a lever 310 that may be directly or indirectly linked to one of the buttons or other user input devices. The lever 310 is in turn connected to the RFID tag 314 and a shield 330 is provided that blocks a signal from an RFID reader from successfully activating the tag 314 in the closed or proximate position shown in FIG. 3A. The shield 330 may be positioned relative to the tag 314 with a spring or other resilient mechanism 320 that biases the shield against or toward the tag 314 to hold this metal or other shield against the tag 314 and prevent the RFID tag 314 from broadcasting.

As shown in FIG. 3B, though, when the lever 310 is moved as shown at 311 (such as in response to a button or I/O device being operated/depressed by a participant/user of a communication device) the interconnected tag 314 is also moved as shown at 315 away from the shield 330, which physically separates the RFID tag 314 from the shield 330 allowing the RFID tag 314 to broadcast when interrogate by an RFID reader. In other embodiments, the shield 330 may be linked to the lever 310 to move in response to a user pressing down on the lever 310 or a connected button.

The system 200 also may include one or more player/user communication devices 260 that communicate 224 player/device ID data and other user input/selected data through the use of active/semi-active RFID tags. As shown, each of the communication devices 260 includes an active RFID assembly/tag 262. The assembly 262 includes an antenna 264 that may be used to transmit tag memory/data 270 in a communication or signal 224 to the RFID reader/communication device 220 of the interactive station 210. The tag or assembly 262 is active or semi-active and is powered by a battery 268 provided on the device 260. The assembly 262 further includes a computing device for processing user input via the data input portion 276, which may take the simplistic form of one or more buttons 278 or may be more complex with a touchscreen, a key pad, and/or the like.

The computing device of assembly 262 may take a variety of forms such as shown with a processor 265 powered by battery 268 to run one or more logic/applications 266 to process the user input via data input device(s) 276. The processed user input data may be used to modify the user data (or button states) portion or bytes/bits 274 of the tag memory/data and to determine when to transmit the message/signal 224 that will include the UID 272 as well as the user data 274. The tag memory/data stream 270 may be modified in a sequential manner to pass a more complex message to provide slow-speed data communications via signals 224 as discussed above. For example, the logic 266 and CPU 265 may act to process user inputs via buttons 278 to create a message that has a size that is greater than the user data bytes 274 that may be divided into a set of smaller messages or data chunks that may be transmitted along with other data for use in reassembling the message by station engine 214 or game engine 293 such as timestamps and the like.

Figure 4:
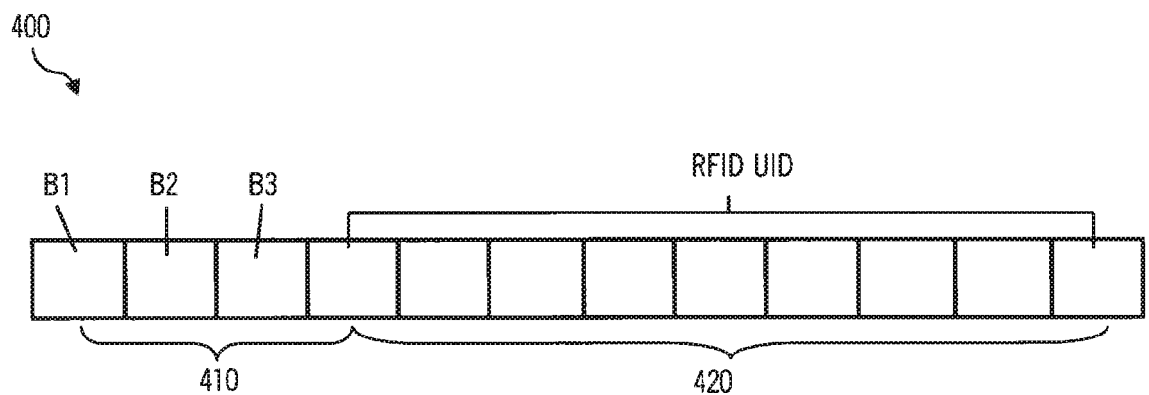
FIG. 4 illustrates tag data (e.g., an RFID bit or byte stream or RFID data stream) that may be provided by an RFID-based communication device in accordance with the present invention.

FIG. 4 illustrates an example of an RFID data (or bit/byte) stream 400 that may be provided by tag memory/data 270 of an active RFID assembly or tag 262. As shown, the RFID memory or a tag chip may be 12 bytes in length, and this length or available data bytes may be divided into a user input/button state section 410 and a tag ID section 420. In this example, the RFID UID may be 9 bytes in length, which allows the communication device using the tag memory 400 to use 3 bytes in section 410 to provide three button states. For example, the first 3 bytes may be used to provide an on/off state (1 and 0 for example) for three buttons that a user can select individually or concurrently (in some cases to allow more information than available by 3 buttons). The data provided by the tag data stream 400 may be passed in a message/signal 224 to an RFID reader 220 that may pass it to a station engine 214 or a game/entertainment engine 293 for processing or interpretation, such as relative to a set of displayed interactive data 218 (e.g., please select answer 1, 2, or 3 that would be associated with first, second, and third buttons or the like).

Figure 5:
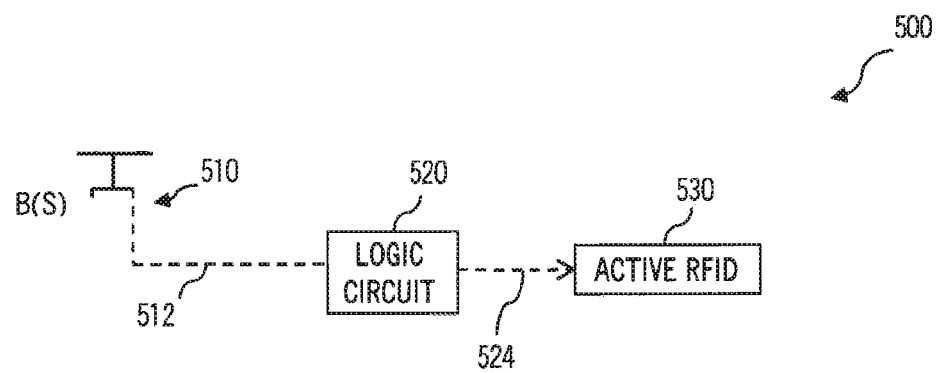
FIG. 5 illustrates a portion of a communication device using an active RFID tag according to an embodiment of the invention.
Figure 6:
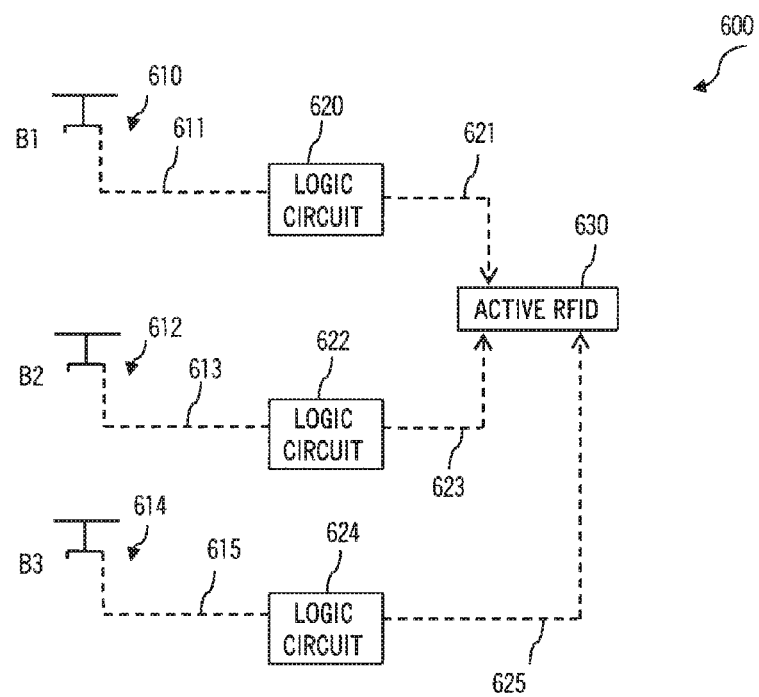
FIG. 6 illustrates, similar to FIG. 5, a portion of a communication device utilizing an active RFID tag to communicate data input by a number of user inputs (e.g., buttons)

Likewise, a variety of configurations may be used to implement the computing device for processing user or data input in an active RFID tag implementation such as the communication device 260. For example, FIG. 5 illustrates an RFID-based user interface or computing device 500 that may be used in a communication device. The interface 500 is shown to include one or more buttons 510 that are linked as shown at 512 (e.g., an electrical circuit) to a logic circuit 520. The logic circuit 520 acts to determine which of the buttons has been pressed and to signal via connection 524 an active RFID tag 530 to modify the button states or user input data portion of the tag memory (e.g., the first three bytes 410 in stream 400) based on this processing. In contrast, FIG. 6 illustrates another RFID-based user interface or computing device 600 that has a set of buttons 610, 612, 614 (i.e., three buttons in this example), and each of these buttons is separately connected via links 611, 613, 615 with a dedicated logic circuit 620, 622, 624. The logic circuits 620, 622, 624 are responsible for setting a corresponding bit, byte, or portion of memory via signals/links 621, 623, 625 of active RFID tag 630 (e.g., each logic circuit 620, 622, 624 operates based on a corresponding button state to set the value of a bit, byte, or portion of memory in active RFID 630 to indicate the state of the button). The active RFIDs 530, 630 may broadcast only upon activation/powering by logic circuits 520, 620, 622, 624 (or other broadcast control devices (not shown)) or always broadcast when active or broadcast when within a vicinity of an RFID reader when semi-active (e.g., beacon when in an RFID field).

Figure 7:
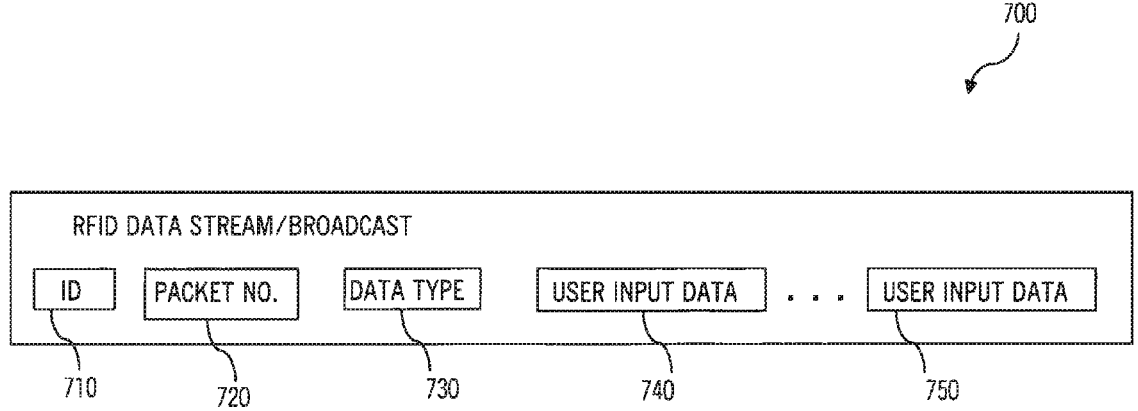
FIG. 7 illustrates one exemplary arrangement for an RFID data stream/broadcast that may be used to transfer data from a communication device using one or multiple transmissions (e.g. small amounts of data transmitted in each RFID tag broadcast/data stream)

FIG. 7 illustrates in more detail an exemplary RFID data stream/broadcast 700 that may be provided by an RFID tag that is used to provide slow speed data communications and not just button states or similar information. As discussed, a communication device may be used to communicate relatively large (e.g., many bytes) messages or amounts of data by setting aside a portion of a single RFID broadcast for other data and then sending a series or set of messages/broadcasts that can be reassembled by logic/software on the interactive station or at the game/entertainment server. As shown, for example, the data stream or broadcast 700 from an RFID tag may include a number of bytes 710 (such as 2 bytes or the like) used to provide the UID of the tag. Another set of bytes/bits 720 and 730 (again 2 bytes for each, in some cases) may provide a packet number and a data type. Then, the other portion of bytes or data portions 740, 750 may provide raw data or user input data, and a computing system or logic/circuitry on the communication device may be used to electronically change these fields with each broadcast (e.g., send a new signal with predefined/preset time intervals separating the signals and a timestamp may be provided, too in the broadcast 700 to facilitate reassembly or in place of the packet number 720). Additionally, a portion of the broadcast 700 may be used to indicate that a signal 700 is a first of a series and a signal 700 is a last or end of a series or message.

Figure 8:
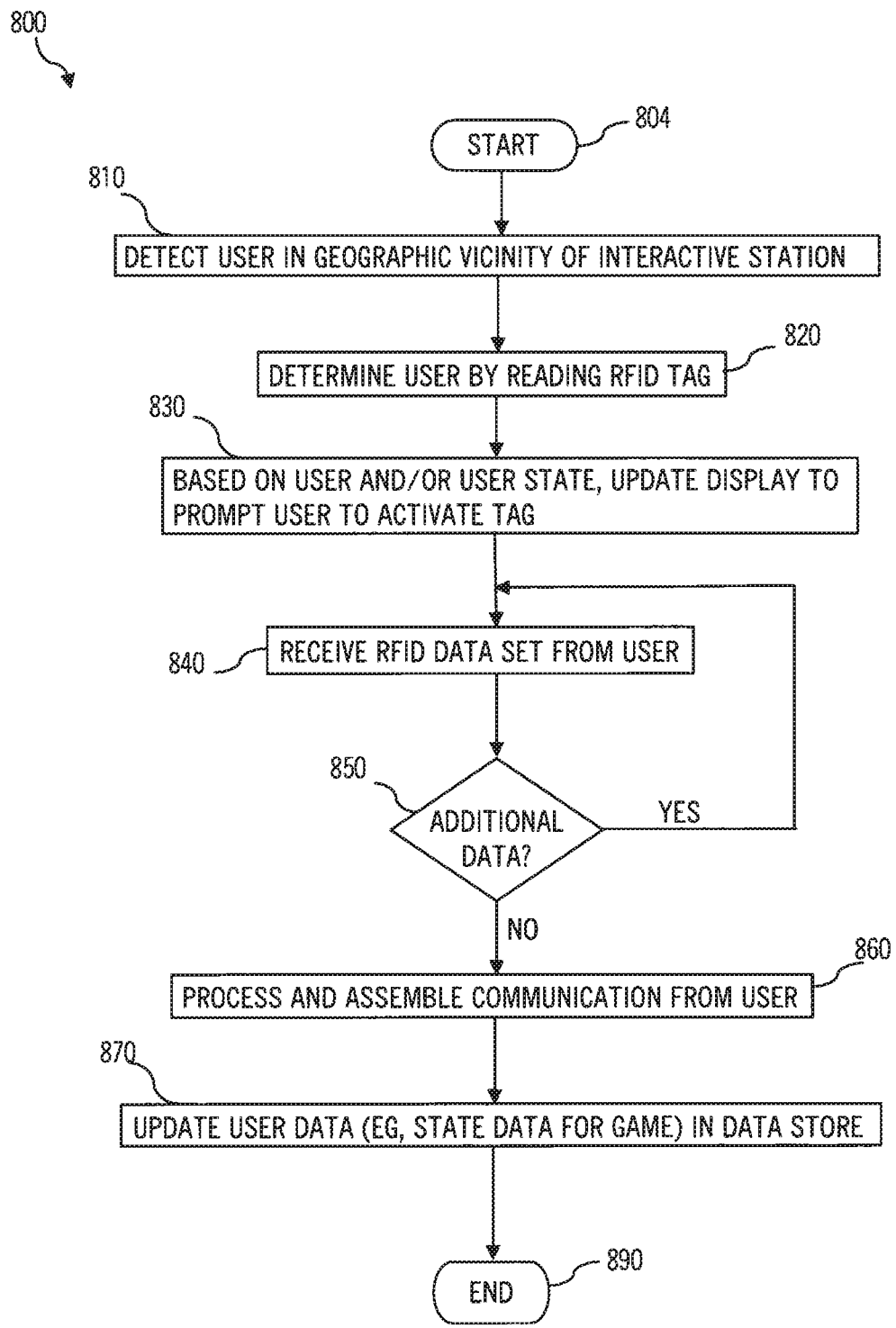
FIG. 8 illustrates a flow chart of an RFID-based communication method in accordance with an embodiment of the invention.

FIG. 8 illustrates a method 800 of communicating a set of data or slow-speed communication using an RFID tag device (such as communication device 260 in FIG. 2). The method 800 starts at 804 such as with configuring a communication device with user input buttons or other input devices, one or more active RFID tags, and, significantly, logic and/or hardware (such as shown in FIGS. 5 and 6) to process user inputs and in response to provide data in RFID data streams or broadcasts (such as shown in FIGS. 4 and/or 7). Additionally, step 804 may include providing an RFID reader at one or more locations (e.g., interactive stations) and providing logic or application run by a processor(s) at the station or at a linked server/computer for processing the RFID-based broadcasts to construe/assemble broadcast messages. The method 800 may also be used, though, for communicating with communication devices that are using passive RFID tags such as communication device 230.

At 810, the method 800 may include detecting a user is in the geographic vicinity of a particular interactive station, and this may involve an RFID reader interrogating or reading a passive RFID tag or receiving a broadcast from an active or semi-active RFID tag in a participant's communication device or controller. At 820, the method 800 may include determining the user's identity by reading tag data on the participant's communication device to retrieve a UID, accessing via a network an entertainment server managing a game or other database of participants, and using the UID as a look up for the participant's ID/name and other information (such as game state or the like). At 830, based on the user's retrieved information such as game state, the method 800 may include updating a display such as a video screen at the interactive station near the participant. This update may include requesting data or communications from the participant. For example, the participant may be asked to guess the answer to a multiple choice question, to enter the answer to a question, or provide some other user or interactivity data.

At 840, an RFD reader or other communication device operates to receive an RFID data set from the participant. As discussed above, this may involve the user operating a user input portion of a communication device such as choosing one or more buttons, operating a keypad, using a touchscreen, or the like. The communication device may be a passive RFID tag-based device and step 840 may involve the RFID reader reading tag memory associated with a depressed button(s) to obtain a UID and a button ID/state. In other cases, the communication device may be an active RFID tag-based device and step 840 may involve receiving a broadcast of tag data that includes a UID and tag data as modified by communication device logic/hardware based on user input (e.g., user pressing one or more buttons).

At step 850, it is determined if additional data is being received or expected from the communication device, and if so, the method 800 continues at 840 with receiving additional data from the communication device and its one or more RFID tags. For example, a passive RFID tag-based device may be operated in a sequential manner to provide a set of data that can later be assembled. More typically, though, an active RFID-tag based device may use its tag memory/data to transmit a message that is too long for a single broadcast payload for the tag(s), and, in this case, repeating steps 840 and 850 allows the RFID reader/wireless communication device to receive two or more broadcasts from the active RFID tag-based device with each broadcast including a stream of data that includes the tag UID along with data modified or changed by the device logic/hardware to communicate a message (e.g., packet numbers, timestamps, and user input or raw data broken into chunks by the logic/hardware after input by the user operating the I/O portion of the communication device).

At 860, the method 800 continues with processing and assembling the communication from the user, which may simply involve construing a single broadcast of user data from a passive RFID tag or it may involve assembling two or more messages into a longer message from an active RFID tag. At 870, the user data in the database of the entertainment or game server may be updated based on the received and processed data from the communication device. This may involve changing their state data for a game such as to indicate a wrong or a correct answer, changing point totals, indicate completion of a test/level/step/station or the like. Step 870 may also include modifying a display at the interactive station based on the received, processed, and assembled (when necessary) communication from the user such as to provide them feedback on their input (e.g., indicating they were correct or incorrect and so on). The method 800 may continue at 810 with detecting a next user/participant or it may end at 890.

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention. The communication devices and methods described herein may generally be used in a location-based attraction, which may include malls and even stores. For example, a shopper may be provided a wireless communication device and when in the vicinity of a particular display, enter a selection such as pressing a button (e.g., a coupon request button or the like). This may result in a coupon being provided in a physical form to the shopper (e.g., as a reward for traveling in a particular manner throughout the geographic area of the store/mall) or by an RFID reader writing data to the memory of the communication device (e.g., the memory/data storage component(s) of the RFID tag). By activating a passive RFID tag with an associated button, this may allow the RFID reader to write to the memory (which may have been blocked without the user pressing the button and activating the RFD tag). Then, the passive RFID tag may be read upon checkout of the store to obtain the coupon value.

The RFID components described herein may take numerous forms to practice the invention. For example, the tags may be standards-based RFID tags such as the FeliCa™ or MiFare™ RFID chips, Taggit™ passive RFID tags, active RFID tags, or similar technology available from Sony Corporation, NXP Semiconductors, Texas Instruments, Inc., Axcess International, Inc., and others. Each RFID tag may include an integrated circuit storing and processing information, modulating and demodulating an RF signal, and providing other useful functions such as providing tag memory or data storage. Each tag may further include an antenna for receiving and transmitting signals or broadcasts to RFID readers or the like. With the active RFID tags, a battery may be provided that is used to power the tag and, in some cases, the computing device. In the passive RFID tags, no battery is provided typically and an external source (e.g., the RFID reader) is used to provoke signal transmission (energize the tag to allow reading of the tag memory). The amount of data stored in the memory or data storage of each RFID tag may also vary and range from a plurality of bits (such up to 80 bits or more) to a larger number of bytes (such as up to 8 to 16 bytes or more). The range of the RFID tags (or distance between an RFID reader and the tags for successful data transmission) may also vary and range, for example from less than about 60 centimeters to several up to many meters.

The interactive entertainment/game system may be implemented in a variety of manners, too, and the communication devices and methods are not limited to a particular interactive system or station/installation configuration. For example, the interactive entertainment systems may be configured according to the teaching of U.S. Patent Appl. Publ. No. US 2008/0039206 by Ackley et al., which is incorporated herein in its entirety. As noted in this published patent application, interactive installations may communicate with a game server (and/or with a location server and/or content server) over data links and according to one or more available communication protocols. For example, data packets may be used to transmit information between a game server and an interactive installation in connection with information received from an input device/RFID reader (based on communications with a participant's communication device) or provided to an output/display device. Here, such communication may be enabled with Internet Protocol infrastructure supporting the use of UDP, TCP/IP, HTTP and/or the like. According to an embodiment, interactive installations or stations may be integrated with an interactive gaming system as "atomic" entities such that elements of an interactive installation/station are integrated with a game/entertainment server (and/or a location server and content server) over a single communication interface. For example, communication between an energizer/reader pair (or RFID reader/wireless communication device) and interactive system servers.

According to an embodiment, a game or system participant may be associated with a communication device (e.g., have record in a database accessible by the game server that has fields that link a participant ID with a UID of a communication device or the like). The communication device may be adapted to communicate with a game or entertainment/interactivity server via an RFID reader (and a station engine and CPU/controller), which then may use a wired or wireless communication network using communication protocols such as, for example, email (including POP3 and/or SMTP), Wireless Application Protocol (WAP), Wireless Web, HTTP, TCP/IP, SIP, real-time streaming protocol (RSTP), IMAP, MMS, just to name a few.

In some prior interactive game systems, a player was able to trigger an RFID-activated event by swiping an RFID tag over a reader. In such a game system, the only thing the player could do was stand in the right place with the RFID tag or swipe the RFID tag to trigger the effect. In either case, the player was not really able to make a conscious or act gameplay decision (e.g., either their tag is being read or it is not by the game system). In contrast, the above described interactive system and communication methods may be used to allow users/players to interact with a game or other interactive system including making decisions about which (of multiple) RFID tags to show to the interactive system and when to show them (e.g., allow particular tag data to be read at certain times and in certain locations of the interactive game system). To try to provide such ability with short-wave, swipe RFD systems the player or guest would have to carry a number of separate tags/cards and then swipe their choice of tags over the RFID reader, which would be a non-ideal implementation that players or users likely would find clunky and annoying to use and would likely fail (such as when players lose a swipe card from their answer set or damage the tags, which may happen quickly in many amusement/gaming environments).

We claim:

1. An interactive entertainment system, comprising:
an interactive station comprising a radio-frequency identification (RFID) reader; and
a plurality of communication devices each including a user input portion operable by a user of the interactive entertainment system, wherein each of the communication devices comprises an RFID assembly that broadcasts to the RFID reader a set of tag data that is user selectable by operation of the user input portion,
wherein the RFID assembly comprises an active or semi-active RFID tag with a tag memory component and a computing device processing input from the user input portion and, in response, modifying the set of tag data broadcast to the RFID reader by the RFID tag, whereby an operator defines data broadcast to the RFID reader through operation of the user input portion,
wherein the modifying by the computing device operates comprises sequentially modifying the a portion of the tag memory component to transmit a series of differing broadcasts using the active or semi-active RFID tag, and
wherein the computing device processes the input from the user input portion to generate a message and the differing broadcasts each includes a subset of data from the generated message.

2. The system of claim 1, wherein the user input portion comprises a set of buttons and the set of tag data comprises a byte stream including a first portion providing the state of each of the buttons and a second portion comprising an RFID UID.

3. The system of claim 1, wherein the computing device separates the input from the user input portion into a plurality of user input data messages, and wherein the modifying of the set of tag data comprises transmitting a series of RFID data broadcasts each comprising one of the user input data messages, a UID, and data for use in assembling the series of RFID data broadcasts into a received message.

4. The system of claim 3, further comprising a computing device running logic for assembling the series of RFID data broadcasts to produce the received message and for operating the interactive station in response to the user input data messages.

5. The system of claim 3, wherein the data for use in assembling the series of RFID data broadcasts comprises a packet identification or comprises a time stamp indicating a time of transmittal from the communication device.

6. An RFID-based communication device, comprising:
a data input assembly;
an active RFID tag comprising an antenna and a tag memory component; and
a computing device communicatively linked to the data input assembly,
wherein the computing device operates in response to user input via the data input assembly to modify at least a portion of the tag memory component, whereby a data broadcast by the active RFID tag is defined in part by the user input,
wherein the computing device operates in response to the user input to sequentially modify the portion of the tag memory component to transmit a series of differing broadcasts using the active RFID tag, and
wherein the computing device processes the user input to generate a message and the differing broadcasts each includes a subset of data from the generated message.

7. The communication device of claim 6, wherein the data input assembly comprises buttons, wherein the computing device operates to determine a set of the buttons that have been pressed, and wherein the modified portion of the tag memory component includes data indicating the set of pressed buttons.

8. The communication device of claim 6, wherein the tag memory component further stores a UID and data identifying the subset of data broadcast in each of the differing broadcasts for reassembly of the differing broadcasts by a receiving device into a received message linked to the communication device and corresponding to the generated message.

9. The system of claim 1, wherein the modifying of the set of tag data in response to operation of the user input portion includes combining two or more user selections and updating the set of tag data to include two or more data elements associated with the user selections.

* * * * *